(12) United States Patent
Trimpe et al.

(10) Patent No.: US 11,624,598 B2
(45) Date of Patent: Apr. 11, 2023

(54) APPARATUS FOR CORRECTING BULLET CARTRIDGE CASING NECK DISTORTIONS

(71) Applicants: Gary L. Trimpe, Preston, KS (US); Daryl A. Trimpe, Pratt, KS (US)

(72) Inventors: Gary L. Trimpe, Preston, KS (US); Daryl A. Trimpe, Pratt, KS (US)

(*) Notice: Subject to any disclaimer, the term of this patent is extended or adjusted under 35 U.S.C. 154(b) by 296 days.

(21) Appl. No.: 17/030,061

(22) Filed: Sep. 23, 2020

(65) Prior Publication Data
US 2021/0055090 A1    Feb. 25, 2021

(51) Int. Cl.
*F42B 33/10* (2006.01)
*B23B 5/08* (2006.01)
*B21D 3/16* (2006.01)

(52) U.S. Cl.
CPC .............. *F42B 33/10* (2013.01); *B21D 3/16* (2013.01); *B23B 5/08* (2013.01); *B23B 2215/10* (2013.01)

(58) Field of Classification Search
CPC .. F42B 33/10; B21D 3/16; B23B 5/08; B23B 2215/10
USPC .................................................. 86/19.6, 19.7
See application file for complete search history.

(56) References Cited

U.S. PATENT DOCUMENTS

| | | |
|---|---|---|
| 621,941 A | 3/1899 | Parmenter |
| 742,768 A | 10/1903 | Wetzig |
| 1,743,295 A | 1/1930 | Tuffery |
| 3,143,919 A | 8/1964 | Estes |
| 3,251,114 A | 5/1966 | Lewis |
| 3,274,661 A | 9/1966 | Westbrook |
| 3,818,563 A | 6/1974 | Beaulieu |
| 4,133,249 A * | 1/1979 | Bachhuber ............ F42B 33/004 86/44 |
| 4,653,157 A | 3/1987 | Alexander |
| 4,679,330 A | 7/1987 | Williams |
| 4,686,751 A | 8/1987 | Gracey |
| 4,723,472 A | 2/1988 | Lee |
| 5,050,475 A | 9/1991 | Kolmer |

(Continued)

FOREIGN PATENT DOCUMENTS

| | | |
|---|---|---|
| EP | 1705455 | 9/2006 |
| GB | 103554 | 2/1917 |

OTHER PUBLICATIONS

"Model 2400 Match Precision Case Trimming Lathe," redding-reloading.com. https://web.archive.org/web/20101001232327/http://www.redding-reloading.com:80/online-catalog/77-model.

(Continued)

*Primary Examiner* — Bret Hayes
(74) *Attorney, Agent, or Firm* — Kenneth H. Jack; Davis & Jack, L.L.C.

(57) ABSTRACT

An apparatus for correcting an aberration in a bullet casing's neck, the apparatus incorporating a support frame; a collet chuck and collet sleeve combination whose collet chuck presents a circumferential array of jaws having longitudinal ends, wherein the collet chuck further has a throat extending longitudinally from the jaws' longitudinal ends; a bullet ogive centering annular land fixedly attached to or formed wholly with the collet chuck, the bullet ogive centering annular land being positioned at an oppositely longitudinal end of the throat; rotatable mounting conical bearings and bushings which attach the collet chuck and collet sleeve combination to the support frame; and a turn wheel connected operatively to the collet chuck and collet sleeve combination.

29 Claims, 11 Drawing Sheets

(56) References Cited

U.S. PATENT DOCUMENTS

| | | | |
|---|---|---|---|
| 5,088,169 A | 2/1992 | Touzet | |
| 5,221,806 A | 6/1993 | Chaney et al. | |
| 5,301,436 A | 4/1994 | Johnston | |
| 5,497,539 A | 3/1996 | Blodgett et al. | |
| 5,515,766 A | 5/1996 | Fleury | |
| 5,788,429 A | 8/1998 | Gracey | |
| 6,050,169 A | 4/2000 | Voros | |
| 6,397,718 B2 | 6/2002 | Jamison et al. | |
| 6,412,385 B1* | 7/2002 | Willis | F42B 33/10 86/19.5 |
| 6,718,645 B2 | 4/2004 | Berger | |
| 7,650,825 B1 | 1/2010 | Lee et al. | |
| 7,703,369 B1* | 4/2010 | Lee | F42B 33/10 86/43 |
| 8,122,808 B2* | 2/2012 | Koch | F42B 33/001 86/45 |
| 8,276,494 B2* | 10/2012 | Palkowitsh | F42B 33/001 86/45 |
| 9,228,820 B2 | 1/2016 | Huang | |
| 9,696,124 B2 | 7/2017 | Keska | |
| 9,970,741 B1 | 5/2018 | Eldredge | |
| 10,473,443 B1 | 11/2019 | Gent | |
| 2014/0318352 A1* | 10/2014 | Cottrell | F42B 33/10 86/19.7 |

OTHER PUBLICATIONS

"Classic Case Trimmer Kit with 3 Pilots & 3 Collets," forsterproducts.com. Mar. 2, 2017. https://web.archive.org/web/20170302072309/http://www.forsterproducts.com:80/product/c.

"Sinclair International—Sinclair Concentricity Gauge," sinclairintl.com. Jan. 25, 2014. https://web.archive.org/web/20140125040057/http://www.sinclairintl.com/reloading-equi.

"Slant Bed Concentricity Gauge," redding-reloading.com. Accessed: Jul. 5, 2020. https://web.archive.org/web/20200705002358/https://www.redding-reloading.com/online-catalog/216.

"Hornady Neck Turn Tool," hornady.com. Accessed: Jul. 5, 2020. https://web.archive.org/web/20200705010825/https://www.hornady.com/reloading/case-care/case-prep-tools/neck-turn.

* cited by examiner

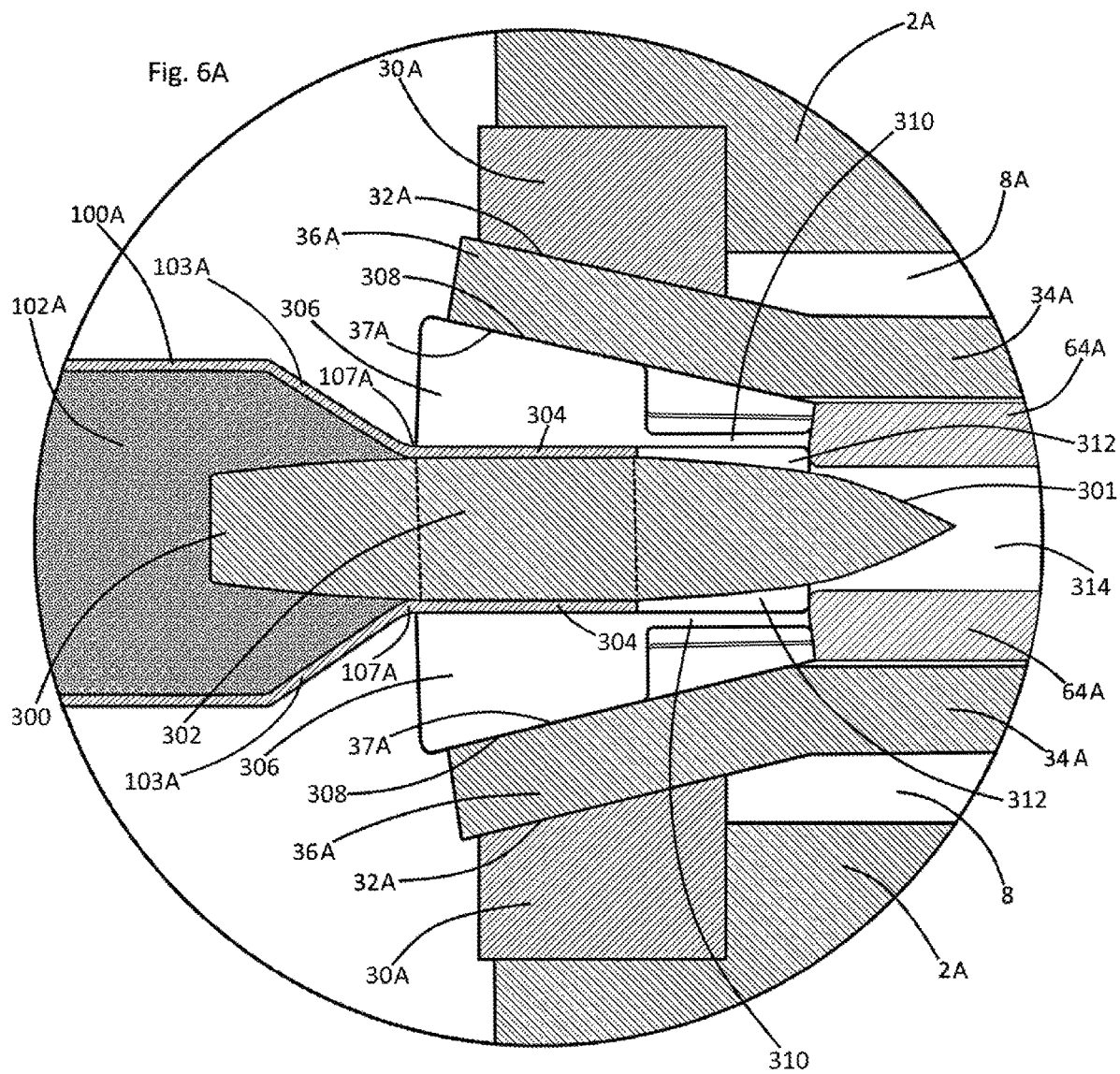

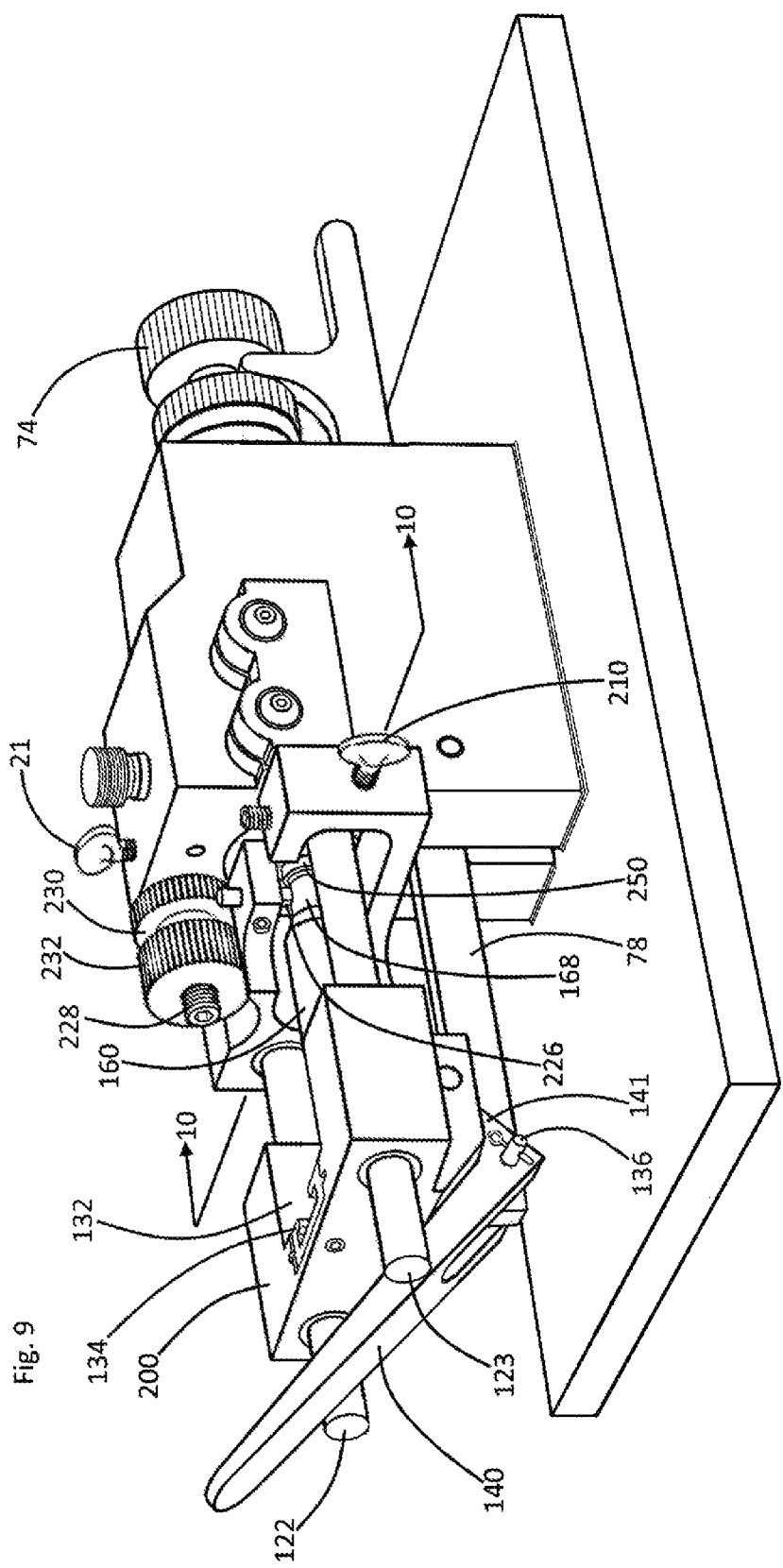

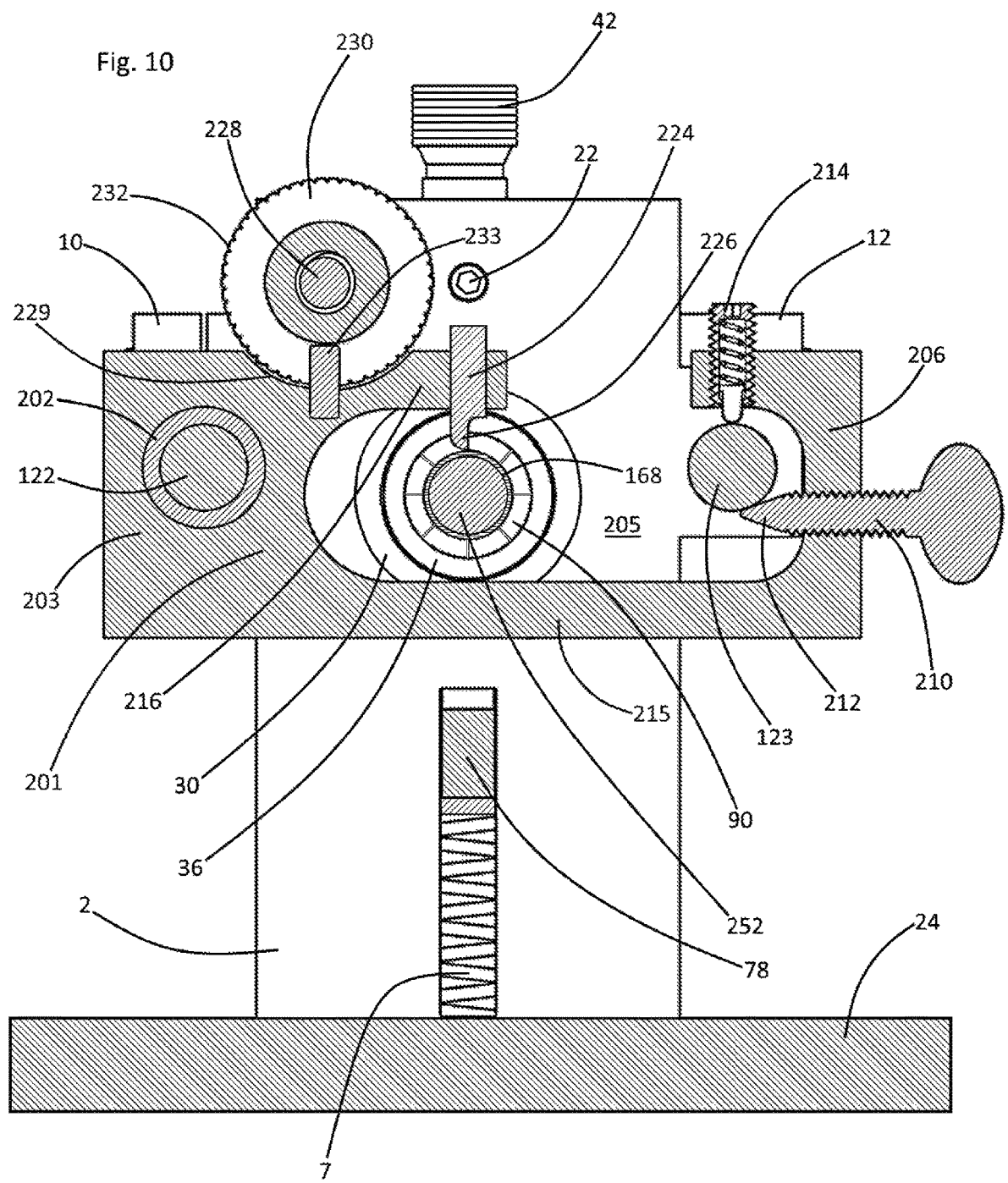

APPARATUS FOR CORRECTING BULLET CARTRIDGE CASING NECK DISTORTIONS

FIELD OF THE INVENTION

The instant inventive apparatus relates to machinery which is adapted for holding a bullet cartridge casing as a workpiece and for effecting metal working changes and alterations to such casing's geometric characteristics and features. More particularly, the instant invention relates to such machines which are adapted for altering axial and circular aberrations or distortions at and about such casing's bullet receiving neck portion.

BACKGROUND OF THE INVENTION

During a rifle cartridge reloading process, the neck of the cartridge's case which is to undergo loading or reloading is commonly preliminarily forcefully driven into a casing sizing die for purposes of conforming the outer geometries of the casing's body, shoulder, and neck with standardized specifications. Also during such reloading process, a bullet is commonly subsequently forcefully driven into the mouth of the casing's neck in order to seat the bullet within the casing's neck. As a result of the performance of such processes, the casing's neck may occasionally slightly malleably bend out of alignment with the casing's body. Upon such bending, the longitudinal axes undesirably extend with respect to each other at a slight skew angle.

Where such skewing of longitudinal bullet case axes occurs, the neck portion of the casing may, upon firing of the cartridge, undesirably act upon the bullet in the manner of a misdirected or improperly aimed rifle barrel. Such casing neck initiated misdirection or mis-aiming of the bullet may undesirably produce misalignment of the bullet with respect to the central longitudinal axis of the rifle barrel, such bullet misalignment threatening to degrade the velocity of the bullet and to skew the nose of the bullet away from its trajectory line as the bullet emerges from the rifle's muzzle.

In addition to the bullet casing's preferred axial alignment characteristic, as discussed above, the neck of the casing also preferably matches the geometry of a regular circular cylinder. To achieve such cylindrical geometry, the neck portion of the above referenced bullet cartridge case sizing die typically comprises a cylindrical inner wall section which closely matches the desired cylindrical geometry of the cylindrical outer wall of the bullet cartridge casing's neck. Where all outside diameters of a case's neck are greater than the inside diameter of the neck portion of such sizing die, such die may, upon being driven into the casing's neck, properly finally cylindrically configure the bullet cartridge casing's neck.

However, on occasion, some or all of the outside diameters of a bullet cartridge casing's neck are less than the inside neck diameter of the casing sizing die. In such circumstances, the case sizing die may undesirably fail to properly cylindrically configure the casing's neck. Further circular distortions or aberrations may exist at the outer surface of the casing's neck when gauged with respect to the neck's pre-specified circular cylindrical geometry, and the above described case sizing die is typically ineffective in ameliorating such distortions.

Where such neck circularity distortions exist, the annular seal of the bullet within the neck may be compromised, reducing initial bullet driving gas compression and degrading the bullet's muzzle velocity. Outer surface circular distortions of the casing's neck may also undesirably misalign the bullet with respect to the barrel's central longitudinal axis.

The instant inventive apparatus for correcting bullet cartridge casing neck distortions solves or ameliorates the above referenced neck axis distortions and/or neck circularity distortions by incorporating within the apparatus specialized bullet cartridge case holding, extending, and rotating element's which are capable of securely positioning and holding a case neck working mandrel within the bullet cartridge case's neck end for further performance by the apparatus of malleable neck axis straightening steps and/or rotary casing neck lathing.

BRIEF SUMMARY OF THE INVENTION

A first structural component of the instant inventive apparatus for correcting distortions in a bullet cartridge casing's neck comprises a support frame. In a preferred embodiment, the support frame component is composed of an aluminum or steel block having a milled longitudinally extending hollow bore. In correspondence with a rifle's bullet cartridge which has a longitudinally extending bullet nose end and an oppositely longitudinal base or rim, the frame component of the instant inventive apparatus may be recognized as having longitudinal and oppositely longitudinal ends. The frame's hollow bore preferably extends between and opens at such longitudinal and oppositely longitudinal ends.

A further structural component of the instant inventive apparatus comprises a collet chuck and collet sleeve combination. In the preferred embodiment, such combination's collet chuck has an oppositely longitudinally positioned array of jaws which circumferentially surround and define a substantially cylindrical mandrel receiving and clamping space. In the preferred embodiment, a longitudinal end of such mandrel receiving space preferably comprises a longitudinally extending throat which may perform a function of receiving a longitudinal extension of a bullet cartridge casing's neck and a bullet mounted therein. Extension of the longitudinal end of a rifle cartridge into the instant invention's mandrel receiving and clamping throat is recognized as a step of assembly of the inventive apparatus wherein the apparatus includes and utilizes the bullet received within the casing's neck as a casing neck working mandrel.

Further structural components of the instant inventive apparatus comprise bullet aligning means which may comprise either a plurality of flexible jaw drawing ties and/or a bullet ogive centering land, such alternative components being fixedly attached to or formed wholly with the collet chuck.

Where the bullet aligning means comprise the plurality of flexible jaw drawing ties, such ties preferably extend longitudinally from longitudinal ends of the chuck's wedge shaped jaws. The flexible nature of such ties beneficially allows the jaws' clamping surfaces to be driven radially inwardly by the collet sleeve without axial tilting of the jaws.

Where the bullet aligning means comprise the alternatively provided bullet ogive centering land, such land is preferably positioned within the throat, immediately longitudinally from the longitudinal ends of the jaws. Where such bullet ogive centering land component is provided, its surface preferably extends annularly or circumferentially about the throat's longitudinal axis. Such land is preferably conical, forming an angled, beveled, or chamfered transition between the longitudinal ends of the casing neck clamping jaws and the smaller diameter of the longitudinal end of the throat.

Further structural components of the instant inventive apparatus comprise mounting means which operatively attach the collet chuck and collet sleeve combination to the support frame for rotation within the frame. Such means preferably positions the chuck and sleeve combination within the frame's preferably provided hollow bore, such positioning orienting the combination in precise alignment with the hollow bore's longitudinal axis. To achieve such rotating mount, longitudinal and oppositely longitudinal bushings are preferably fixedly mounted to the frame, such bushings respectively being positioned and securely aligned with the frame's hollow bore at its longitudinal and oppositely longitudinal ends. In a preferred embodiment, the bushings are internally beveled or conically flared so that they respectively flare or widen in the longitudinal and oppositely longitudinal directions.

Where the rotatable mounting means provide flared bushings, as is preferred, such means preferably further comprise mating externally flared longitudinal and oppositely longitudinal collet sleeve ends. Such mating conically flared ends advantageously dually function within the flared bushings as rotary bearings and as axial centering and aligning members.

Further structural components of the instant inventive assembly comprise turning means which are connected operatively to the collet chuck and collet sleeve combination, such means allowing an operator to manually rotate the sleeve and chuck combination about the longitudinal axis within the hollow bore of the frame.

In operation, the bullet component of a rifle cartridge may suitably temporarily serve as a case neck working mandrel component of the inventive apparatus. To initiate such bullet's use as a mandrel component, the bullet and cartridge case neck may be longitudinally inserted into and received within the oppositely longitudinal end of the throat. Such throat end constitutes a cylindrical mandrel receiving space which is formed between the jaws at the oppositely longitudinal end of the collet chuck. In the preferred embodiment, such mandrel receiving space has a length dimension in the longitudinal direction which is sufficient to allow the jaws to completely cover and engage that portion of the bullet/mandrel which is annularly encased or surrounded by the casing's neck. Where a bullet ogive centering land is provided, proper sizing and positioning of such land in relation to the jaws' oppositely longitudinal ends allows such land to function as an insertion gauging stop. Accordingly, the ogive centering level insures a proper longitudinal insertion of the bullet/mandrel.

Such ogive centering land further beneficially assures a cessation of the longitudinal cartridge insertion at the point where the oppositely longitudinal ends or edges of the jaws reside at the angular transition which commonly resides between the casing's neck and the casing's conically angled shoulder section. Such extension stopping contact function of the suitably provided ogive centering land further advantageously performs a function of precisely aligning the nose of the bullet with the throat's central longitudinal axis.

Where the bullet aligning means comprise the alternatively provided plurality of flexible jaw ties, the concentric and cylindrical configurations of the neck of the cartridge's casing, the body of the bullet which radially inwardly underlies such neck, and the jaw's clamping surfaces which radially outwardly overlie such neck, may themselves function as bullet aligning structures. The flexible nature of the jaw ties beneficially allow the jaws to precisely clamp radially inwardly against such concentrically underlying structures. Accordingly, the jaw ties allow precise axial alignments of the jaws' clamping surfaces to translate to both the casing neck and to the bullet. The flexible jaw ties function as bullet aligning means by facilitating such translation of axial alignments.

Following receipt of the casing's neck and underlying bullet within the collet chuck, the collet chuck and collet sleeve combination may be operated to annularly and radially inwardly clamp the jaws against the neck and against the underlying bullet/mandrel. Upon such annular clamping, the bullet is advantageously securely held in precise alignment with the collet chuck's longitudinal axis, such alignment being facilitated by the bullet ogive centering land or by the flexible jaw ties. In a suitable embodiment, the oppositely longitudinal clamping end of the collet chuck may include both the plurality of flexible jaw ties and the bullet ogive centering land.

With the bullet and the neck of the cartridge case so held by the apparatus in axial alignment with the longitudinal axis, radially directed bending forces may be applied to the body of the cartridge's case while the axial alignment of the bullet and neck remain constant. Such bending forces advantageously utilize the annular and angled transition from the casing's shoulder to the casing's neck as a bending locus or fulcrum. Where the extreme oppositely longitudinal ends of the collet chuck's jaws properly reside at such transition, the corner transitions between such jaws' radially inwardly facing clamping surfaces, and such jaws' extreme oppositely longitudinal faces advantageously further function as neck bending fulcrums.

In some circumstances, a bullet cartridge which is clamped and held within the apparatus, in the manner described above, may include a neck axis distortion which is severe enough to allow the operator to visually detect the distortion. In such circumstances, the operator may easily and conveniently rotate the cartridge to upwardly orient the case's axial deflection. Thereafter, the operator may percussively tap or press the case's body downwardly, such operation conveniently eliminating any visually detectable casing neck axis distortion.

Where the rifle cartridge is to be utilized in a marksmanship competition, neck axis distortions of a lesser magnitude, which may not be capable of visual detection, are desirably corrected. In order to utilize the inventive apparatus to detect and correct neck axis distortions which are slight and are not amenable to visual detection, a concentricity gauge may be beneficially mounted upon the frame. In a preferred embodiment, such a gauge has an extendable and retractable foot which is held in contact with the body of the casing, preferably at or near the body's oppositely longitudinal end. Where the casing includes a slight neck axis distortion, the surface of the case's body which resides in the direction of the distortion, and which is positioned at the oppositely longitudinal-most end of the casing will necessarily orbit about the longitudinal axis at a maximum radial height above such axis. Accordingly, the slight neck axis distortion may be most easily and most precisely detected by the concentricity gauge where the foot of the gauge bears against the oppositely longitudinal end of the casing.

In a preferred embodiment, the concentricity gauge's support includes a mounting bracket which is capable of positioning the foot of the concentricity gauge directly above the case's body, such positioning assuring that orbital deflections which are detected by the concentricity gauge are directed upwardly and downwardly or at the 12:00 and 6:00 positions. Corresponding with such preferred upward positioning of the concentricity gauge, upward biasing means are preferably mounted at a casing underlying position, such means being adapted for exerting an upwardly directed bending force against the body of the cartridge case.

To provide such upward bending force, a lower pivoting lever arm is preferably provided, such arm actuating an oppositely longitudinally extending levered arm which pivotally moves upwardly and downwardly immediately beneath the bullet cartridge's case. A bullet case impinging shoe is preferably attached to such levered arm, such shoe advantageously upwardly impinging against and upwardly bending the body of the cartridge's case. An operator's careful performance of such bending actions guided by the concentricity gauge may advantageously canceling any downward neck axis distortion within the range of detection of the concentricity gauge.

Where the concentricity gauge is capable of detecting an orbital variation as small as $1/1000$ths of an inch, and where a bullet cartridge held and rotated by the instant apparatus has a body and shoulder length of three inches, neck axis distortions as small as $1/50$th of a degree may be corrected by the instant inventive apparatus.

Circular aberrations or distortions at the radially outer surface of a bullet cartridge casing's neck are commonly known to be corrected via rotary lathing of the neck. Such lathing commonly entails rotary application of a metal shaving lathing iron to the neck's radially outer surface. Such rotary lathing of the casing's neck preferably travels oppositely longitudinally along the neck, allowing the iron's lathing action to plane the outer surface of the neck into a regular circular cross-sectioned geometric cylinder. However, in the above described apparatus configuration which utilizes the cartridge's bullet as a casing neck working mandrel, the collet chuck's jaws cover the casing's neck, preventing the performance of any lathing operation upon the radially outer surface of the casing's neck.

To alternatively accommodate for such mechanical interference of the collet chuck's jaws with neck lathing, the instant inventive apparatus suitably provides an alternatively utilized adapter which incorporates an oppositely longitudinally extending mandrel as a substitute for the above described bullet/mandrel. Where such substitute adapter mandrel is provided, it is preferably closely fitted for receipt within the mouth of a bullet-less casing's neck. Such substitute mandrel may be annularly clamped and held in the same manner as the above described annularly clamped bullet/mandrel. Similarly with the above described frame support of a concentricity gauge, the frame may alternatively support and deploy a cartridge neck lathing iron and lathing guide assembly. Accordingly, upon alternate installation of such cartridge neck lathing apparatus, the above described rotation of the collet chuck and casing may alternatively effect rotary casing neck lathing. In a suitable embodiment, oppositely longitudinally extending slide bars which are mounted to the frame may, as an alternative to their function of mounting a concentricity gauge, and the above described neck lathing apparatus. Case driving apparatus adapted for longitudinally pushing or pressing a cartridge case onto the secondary mandrel may be similarly alternatively mounted upon such slide bars.

In a suitable alternative embodiment of the lathing assisting mandrel, the element which axially mounted within the bore of the collet sleeve may comprise a unitary mandrel element, such element being threadedly mounted to a longitudinal segment of the collet chuck.

Accordingly, objects of the instant invention include the provision of an apparatus for correcting distortions in a bullet cartridge casing's neck which incorporates structures, as described above, and which arrange those structures in relation to each other in manners described above for achievement of and performance of beneficial functions as described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 6A redepicts the structure of FIG. 6, the view of FIG. 6A omitting an ogive centering land component and substituting a plurality of flexible jaw ties.

FIG. 9 redepicts the structure of FIG. 7, the view showing the structure of FIG. 7 alternatively configured.

FIG. 10 is a sectional view, as indicated in FIG. 9.

DETAILED DESCRIPTION OF A PREFERRED EMBODIMENTS

Figure 1:
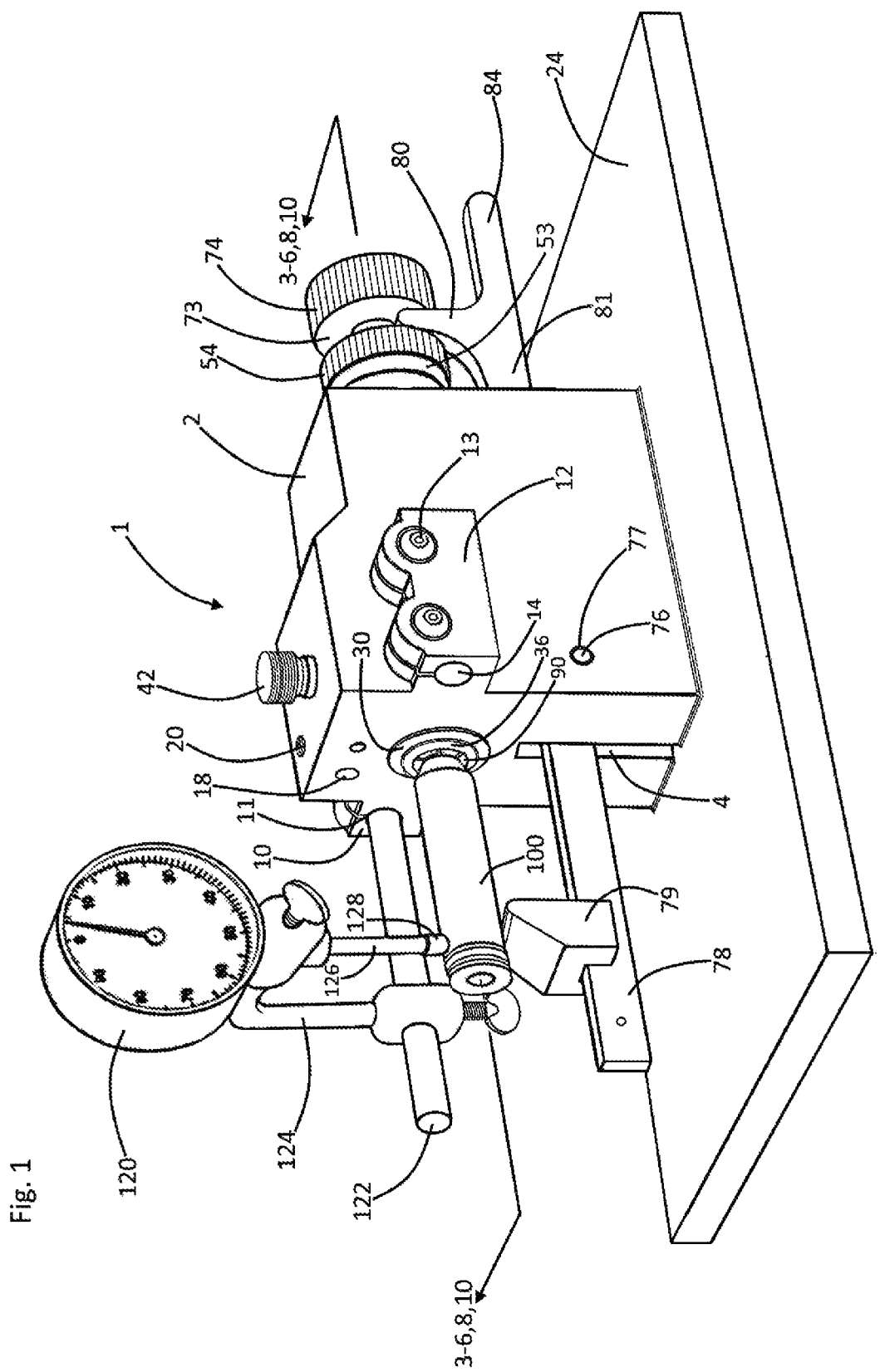
FIG. 1 is a perspective view of a preferred embodiment of the instant inventive apparatus for correcting bullet cartridge casing neck distortions.
Figure 2:
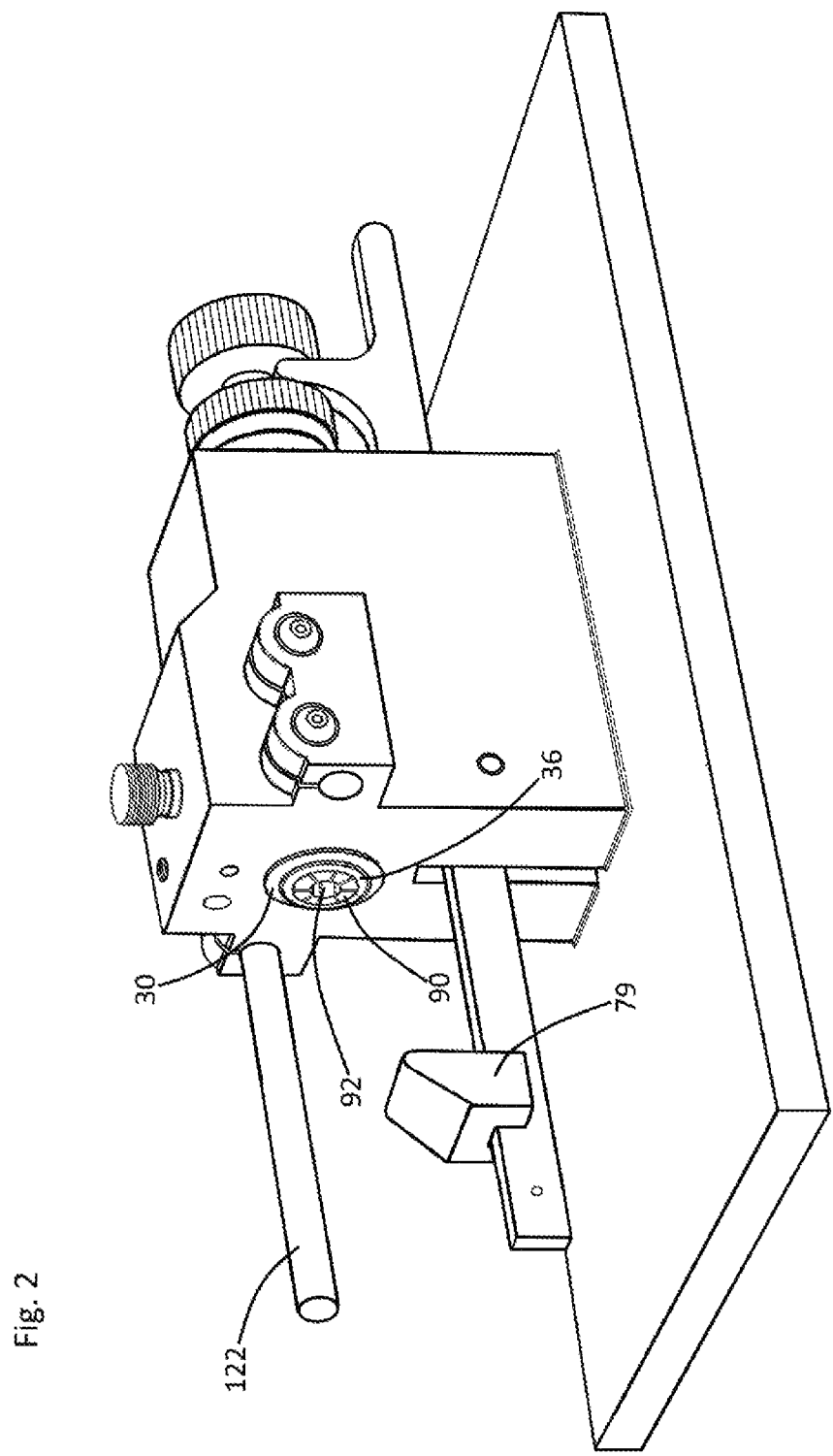
FIG. 2 presents an alternative and partially disassembled configuration of the structure of FIG. 1.

Referring now to the drawings and in particular to Drawing FIG. 1, a preferred embodiment of the instant inventive apparatus for correcting bullet cartridge casing neck distortions is referred to generally by Reference Arrow 1. The apparatus 1 has a frame 2 which may be suitably milled from a block of aluminum or steel, the frame 2 preferably including a fixedly attached or wholly formed lower base member 24.

Figure 3:
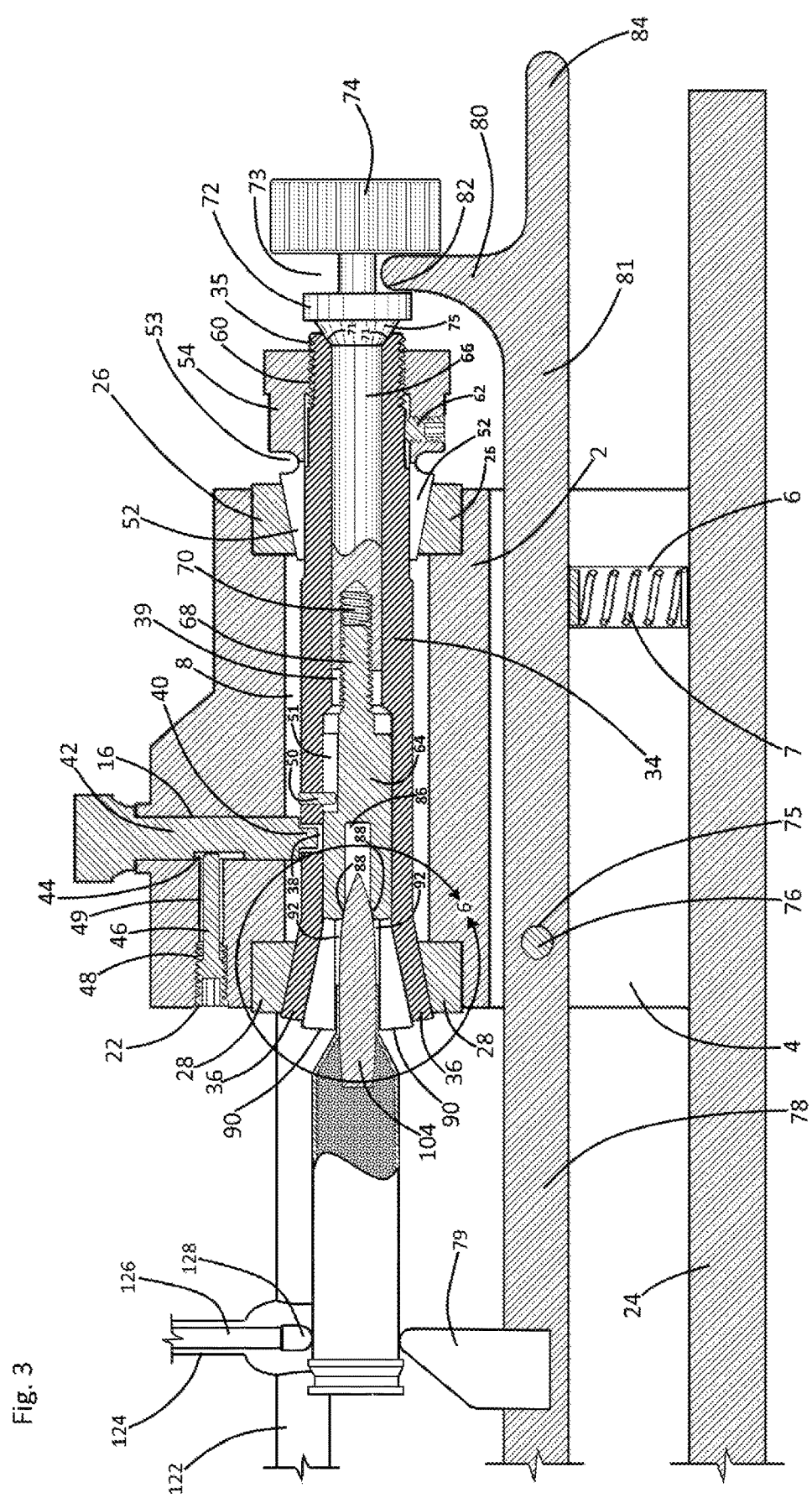
FIG. 3 is a sectional view as indicated in FIG. 1.

Referring simultaneously to FIGS. 1 and 3, the lower end of the frame 2 preferably includes or forms a longitudinally extending slot 4 for mounting of a lever arm 81. Such slot 4 preferably forms a centrally positioned channel 6 at its interior walls, such channel receiving a lever arm leveling spring 7. Lateral and oppositely lateral slide bar brackets 10 and 12 are formed at the frame's lateral and oppositely lateral sides, such brackets preferably being "C" clamp configured and including clamping screws 13 for secure and removable mounting of slide bars which may be received within the bracket's openings 11 and 14.

As shown in FIG. 3, the frame 2 forms a longitudinally extending hollow bore 8 which opens at the frame's longitudinal and oppositely longitudinal ends. A vertically extending stop pin receiving channel 16 communicates with the hollow bore 8, and a longitudinally extending friction pin channel 49 extends from the oppositely longitudinal end of the frame 2 for communication with such vertical channel 16. Such channel 49 has an oppositely longitudinal helically threaded section 48 for receipt of a threaded end 22 of a friction pin 46.

Further features of the frame 2 comprise laterally aligned pivot pin receiving apertures 77 which extend through the oppositely longitudinal end of the frame 2, such apertures 77 having inner ends which communicate with slot 4.

A further feature of the frame 2 comprises a lathe travel actuator mounting channel 18 which opens at the oppositely longitudinal end of the frame 2, such channel 18 communicating with a vertically extending helically threaded set screw channel 20.

The block configuration of the frame 2 depicted in FIG. 1 is considered as being representative of other variously configured frame support structures.

Figure 4:
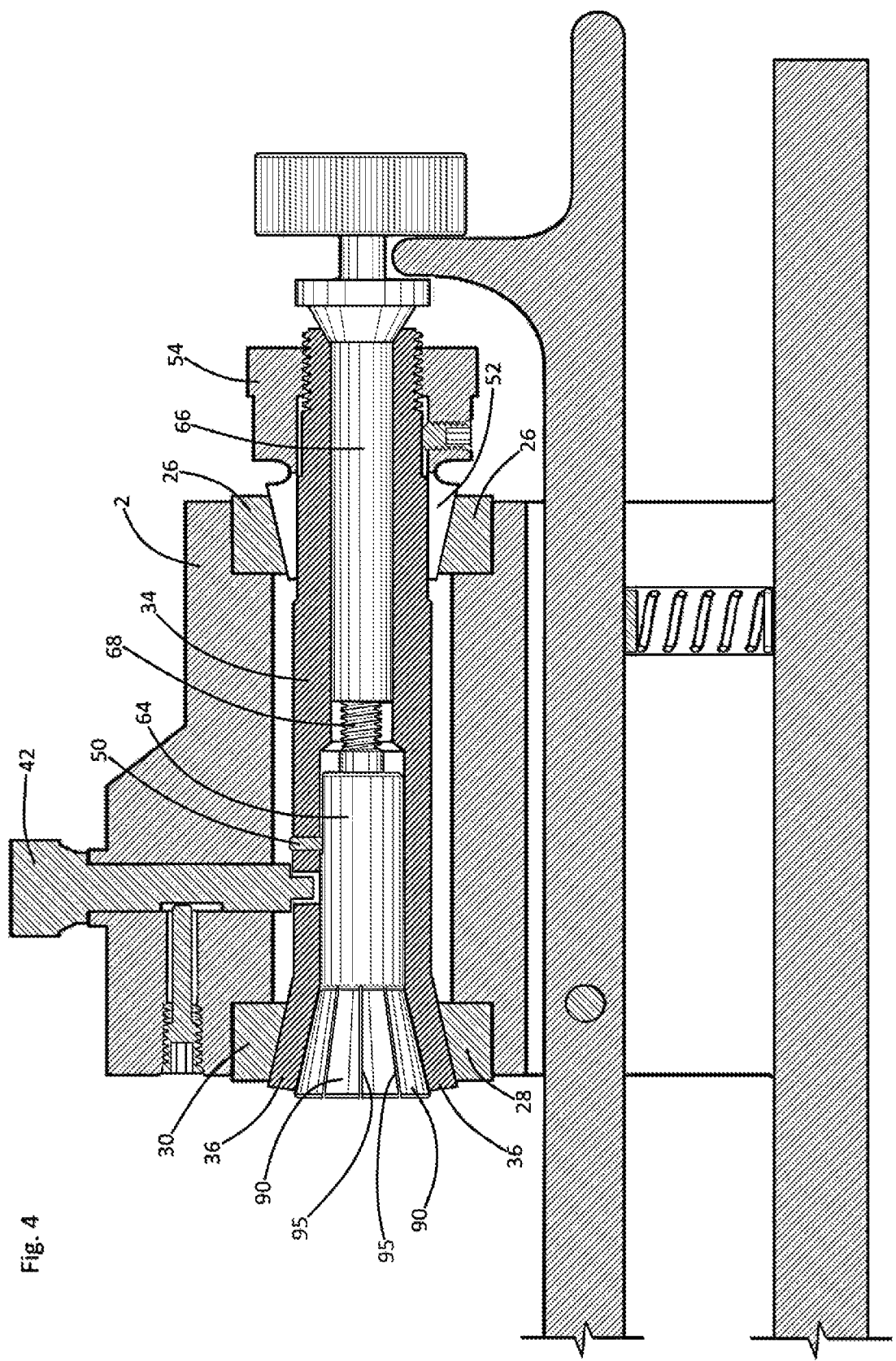
FIG. 4 presents an alternative configuration of the structure of the sectional view of FIG. 3.
Figure 5:
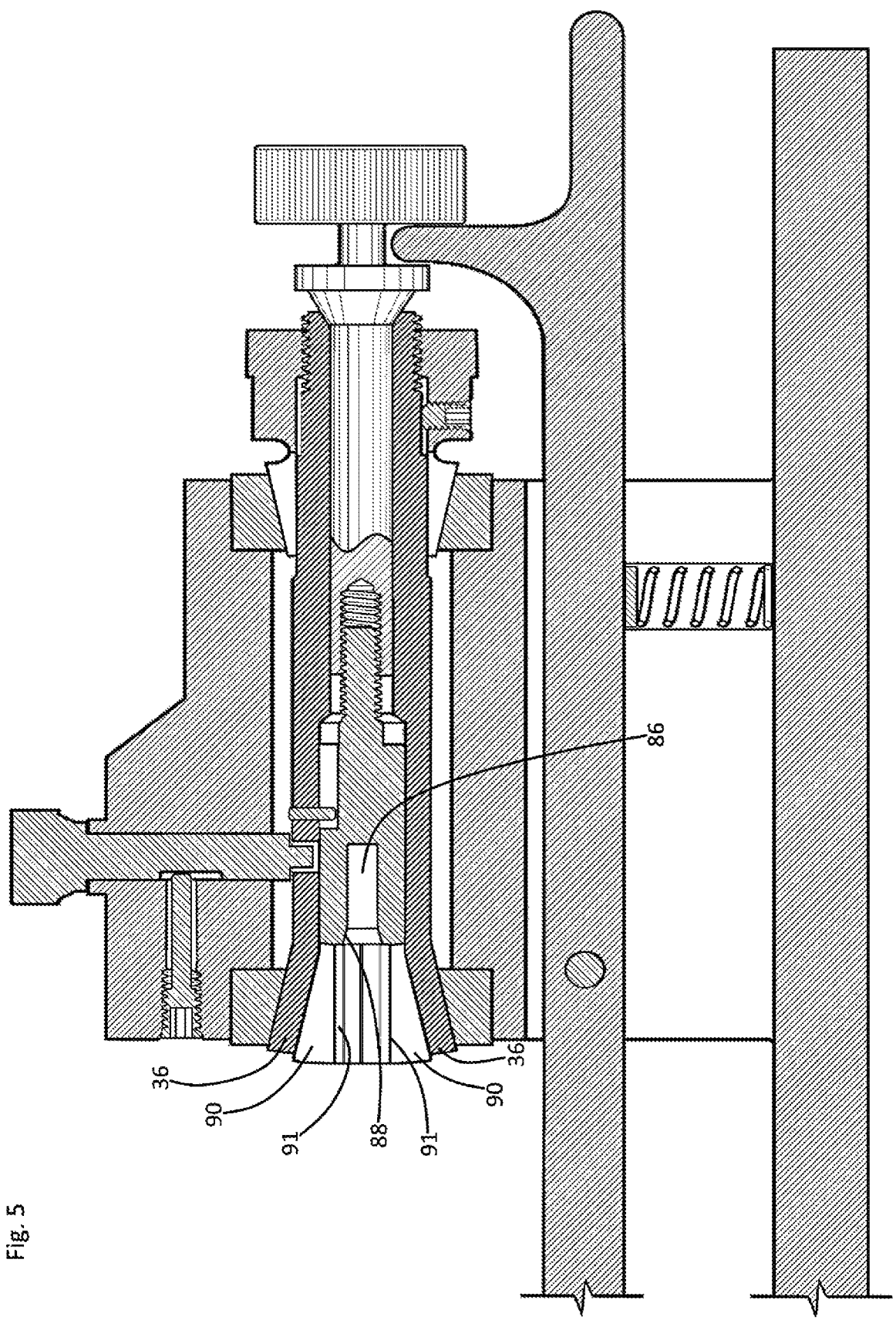
FIG. 5 redepicts the structure of FIG. 4, the view of FIG. 5 showing collet chuck components in sectional view.

Referring simultaneously to FIGS. 1-6, the instant inventive apparatus further incorporates a collet chuck and collet sleeve combination. In a preferred embodiment, the collet chuck component of such combination is segmented to include an oppositely longitudinal segment 64 and a longitudinal segment 66. The extreme oppositely longitudinal end of the collet chuck 64,66 is preferably configured to present a circumferential array of jaws 90, each jaw 90 having radially inwardly facing clamping surface or face 91. Referring in particular to FIG. 4, a circumferential array of longitudinally extending slots 95 circumferentially segment the flared oppositely longitudinal end of the collet chuck 64,66 to form the jaw array 90. The jaws' faces 91 annularly surround a throat whose oppositely longitudinal end 92 is configured as a mandrel receiving and clamping space. The angled radially outer faces of the jaws 90 combine to form the collet chuck's externally flared or conical surface 93.

The longitudinal end 86 of the throat is preferably formed within the chuck's oppositely longitudinal segment 64, such throat end 86 opening at and communicating with the jaws' mandrel clamping space 92. Bullet aligning means, suitably provided in the form of an annular ogive centering land 88, may be provided.

Such land 88 may constitute a transition between clamping space 92 and the longitudinal end 86 of the throat, such land 88 functioning as a bullet ogive biasing and centering component of the collet chuck. In the ogive land bullet aligning means, the ogive centering land 88 is preferably internally conically flared at an angle between 20° and 25° with respect to the central longitudinal axis of the throat 92,86. Such land is preferably capable of bearing in the manner of a tangent surface against, for example, the curving ogive portion 108 at the nose of a bullet 104. Such bullet may be mounted within the casing neck 106 of a cartridge 100, and such neck 106 and bullet 104 may be received within clamping space 92.

Figure 6:
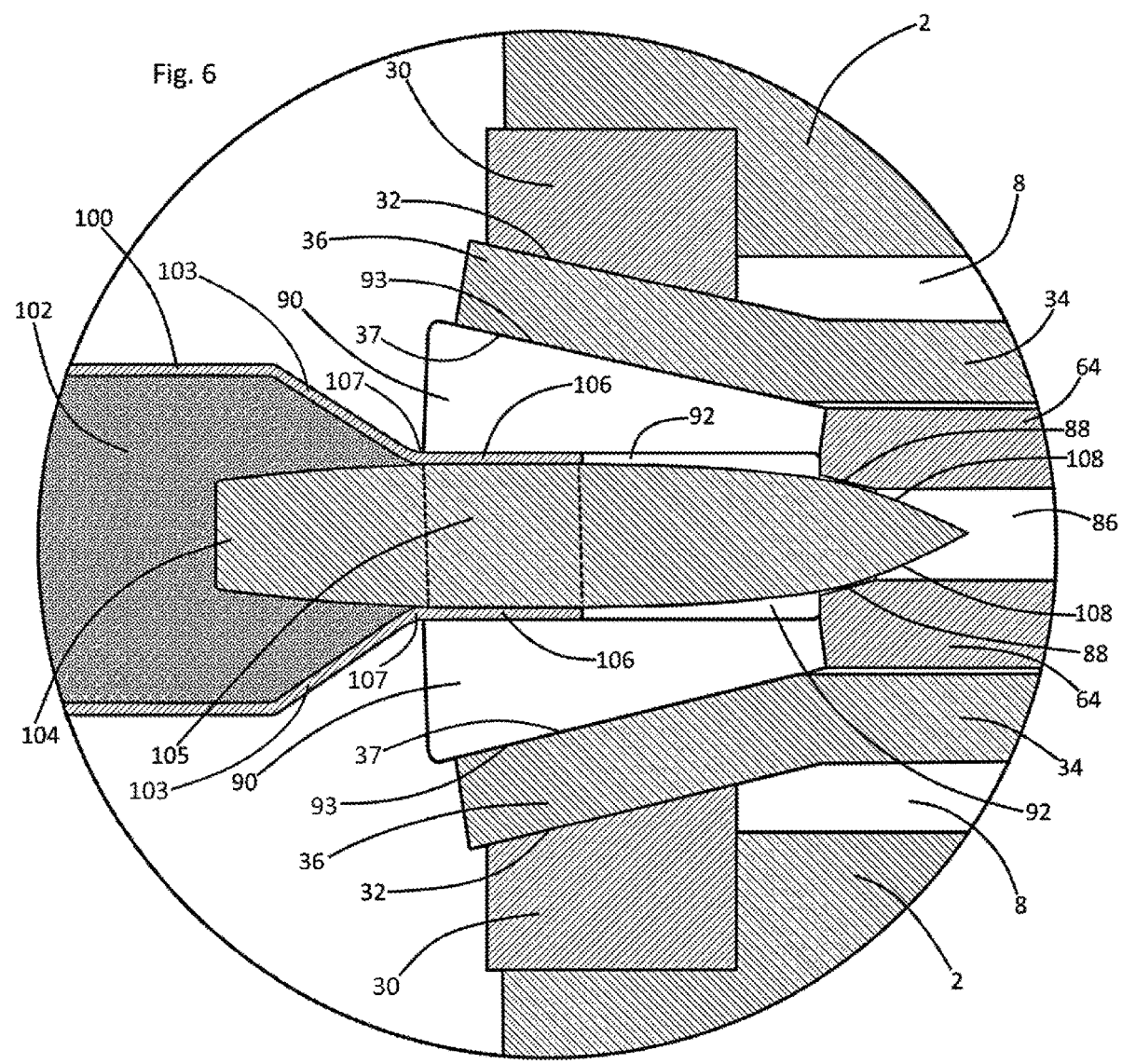
FIG. 6 is a magnified view of a portion of the structure of FIG. 3, as indicated in FIG. 3.

Referring simultaneously to FIG. 6 and FIG. 6A, each structure appearing in FIG. 6A which is referred to by a reference numeral having the suffix "A" is configured substantially identically with similarly numbered structures appearing in FIG. 6. The FIG. 6A alternative presents a suitable alternative bullet aligning means wherein FIG. 6's bullet ogive centering land 88 is eliminated (or is rendered less functionally essential) and wherein a plurality of flexible collet chuck drawing ties 310 are alternatively provided.

Such collet chuck drawing ties 310 may be utilized as a substitute for FIG. 6's bullet ogive centering land in circumstances where the cylindrical body 302 of a bullet 300 is longitudinally extended. Correspondingly, the casing's radially outwardly overlying neck 304 is longitudinally extended. Upon an operation of the collet chuck to cause its oppositely longitudinal segment to exert a longitudinally directed pulling force against the jaw ties 310, the chuck's wedge shaped jaws 306 are drawn longitudinally into the "V" shaped spaces which are outwardly formed by the conical inner surface 37A of the flare 36A of the chuck's collet sleeve 34A and inwardly formed by the conical outer surfaces of the jaws 306. Such tie actuated longitudinal drawing of the jaws 306 drives them radially inwardly against neck 304 and against the underlying cylindrical body 302 of the bullet 300.

During such tie actuated wedge drawing, the oppositely longitudinal ends of the jaw ties 310 advantageously deflect radially inwardly without transmitting any out-of-axis skewing force to the attached jaws 306. Accordingly, the flexible nature of the jaw ties 310 allow the longitudinal and oppositely longitudinal ends of the jaws 306 to be driven radially inwardly at equal rates, beneficially assuring annular clamping pressures at both ends of such jaws and at both ends of the underlying neck 304 are substantially equal. In the FIG. 6A alternative bullet aligning means, the flexible ties 310 allow the cylindrical and concentric surfaces of the bullet 300, the neck 304 and the jaws 306 to experience substantially equal annular clamping forces along their complete longitudinal lengths, beneficially aligning the nose 301 of the bullet 300 with the throat's longitudinal axis.

In contrast, referring to FIG. 6, the oppositely longitudinal ends of jaws 90 may undergo slight radially inward pivoting motions with respect to their longitudinal junctures with the collet chuck segment 64, such junctures deforming in the manner of living hinges. Such pivoting motions of jaws 90 may cause their oppositely longitudinal ends to exert a heightened and unequal annular clamping force at the oppositely longitudinal end of the throat 92,86. Thus, the absence of flexible ties in the collet chuck jaw configuration of FIG. 6 may give rise to a greater functional need for FIG. 6's provision of its bullet ogive centering land 88 as means for bullet aligning and centering.

In a preferred embodiment, both of the above described means for axially aligning the bullet (i.e., both the flexible jaw ties 310 and the bullet ogive centering land 88) may be incorporated and utilized within the collet chuck's throat 312,314 or 92,86, as the case may be.

In a preferred embodiment, an axially central jack screw assembly is provided to interconnect the collet chuck's segments 64 and 66, such assembly including a helically threaded shaft 68 and a mating helically threaded socket 70. The jack screw assembly 68,70 adjustably joins the collet chuck's longitudinal and oppositely longitudinal segments 66 and 64, such joint being capable of adjusting the effective length of the collet chuck. In the preferred embodiment, such jack screw's threaded shaft 68 is fixedly attached to and extends longitudinally from the longitudinal end of the oppositely longitudinal collet chuck segment 64, while the socket component 70 opens oppositely longitudinally at the oppositely longitudinal end of the collet chuck's longitudinal segment 66. A rotation stopping pin receiving channel 51 is preferably formed within the collet chuck's oppositely longitudinal segment 64, such channel 51 opening both radially outwardly and longitudinally to facilitate receipt of a rotation stopping pin 50.

The longitudinal end of the collet chuck's longitudinal segment 66 preferably forms an oppositely conical bearing 75, such bearing 75 biasing against an angled annular wall 71 of a mating conical concavity at the extreme longitudinal end of a collet sleeve 34. The collet chuck's longitudinal segment 66 further forms at its extreme longitudinal end a turn wheel or knob 74. In the preferred embodiment, the longitudinal base 72 of the conical bearing 75 in combination with the turn wheel 74 forms and defines a radially outwardly opening channel 73, the function of which is further discussed below.

The collet sleeve 34 forms a longitudinally extending hollow bore 39 which receives the collet chuck 64,66, and the oppositely longitudinal end of such sleeve preferably presents a conical flare 36 which is closely fitted for nesting receipt of the jaws 90 or jaws 306, as the case may be. Such flare 36 forms a conical inner surface 37 which serves as an oppositely longitudinally opening socket for such fitted and mating receipt of the conically flared collet chuck jaws 90 or 306.

The longitudinal end of the collet sleeve 34 similarly functionally incorporates a conical flare 52, such flare presenting an annular conical external surface which is configured mirroringly with respect to the oppositely flared oppositely longitudinal end of the collet sleeve. Referring simultaneously to FIGS. 3 and 4, the conical flare 52 includes the circumferential array of longitudinally extending slots similar to the slots 95 which define the jaws 90. Such segmenting of the conical flare 52 configures the flare as a circumferential series of wedges, each wedge being supported by a longitudinal segment 54 of the collet sleeve 34. In the preferred embodiment, the juncture of each of the wedge configured segments of the conical flare 52 with segment 54 is substantially thinned by an annular channel 53, such channel functioning similarly with FIG. 6A's flexible ties 310.

The collet sleeve's longitudinal segment 54 includes internal or female helical threads 60 for threaded mounting upon external helical threads 35 formed at the extreme longitudinal end of the collet sleeve's oppositely longitudinal segment 34. The conical flare 52 is preferably wholly or integrally formed with the oppositely longitudinal end of the longitudinal segment 54 so that the flare 52 may adjustably travel longitudinally or oppositely longitudinally with segment 54 as such segment turns and counter-turns along helical threads 35. Upon clockwise turning of the longitudinal segment 54, each of the wedge shaped segments of the flare 52 is driven oppositely longitudinally along the sleeve segment 34, such wedge shaped segments simultaneously bearing against a conical inner surface of a longitudinal bushing 26. The circumferential array of segmenting slots which form the wedge segments of flare 52 allows each such segment to travel radially inwardly toward sleeve 34 without binding against its circumferentially adjacent flare wedge segments. During such radially inward wedge travel, the thinned junctures of the flare wedge segments with the sleeve's longitudinal segment 54 allow the longitudinal ends of the flare wedge segments to move radially inwardly consistently with the radially inward motions of the oppositely longitudinal ends of such wedge segments.

As a result of the combined actions of the above described channel and slots associated with flare 52, the flare 52 is able to maintain precisely abutting contacts at the bushing 26/flare 52 interface and at the flare 52/sleeve 34 interface while the flare 52 is driven oppositely longitudinally along the sleeve 34 and within the bushing 26. Through the operation of such channel and segmenting slots, the axial centering function of the conical bushing 26 is precisely translated through the flare 52 to the longitudinal end of the collet sleeve 34. Such centering action combines with the centering function of the collet chuck's longitudinal conical flange 75 to precisely axially align the longitudinal end of the collet chuck.

A threaded set screw 62 is provided to allow the conical flare 52 to be secured at a selected longitudinal position along the sleeve 34. At a properly selected and set screw fixed longitudinal position of flare 52 with respect to the conical bore of bushing 26, the flare 52 remains capable of functioning both as a rotary bearing, facilitating manually actuated rotation of the collet chuck, and as means for axially aligning longitudinal end of the collet chuck and collet sleeve combination.

The collet sleeve 34 preferably includes a radially extending and radially opening pin receiving socket 38, the function of which is further discussed below, and further includes the rotation stopping pin 50 which extends into and engages the longitudinally extending slot 51 of the oppositely longitudinal segment 64 of the collet chuck.

Mounting means are necessarily provided for rotatably supporting the collet chuck and collet sleeve combination within the frame 2, such means preferably supporting such combination within the frame's hollow bore 8 in precise alignment with such hollow bore's longitudinal axis. A preferred mounting means comprise the longitudinal and oppositely longitudinal conically bored bushings 26 and 28 which are mounted in concentric alignments with the longitudinal and oppositely longitudinal openings of the hollow bore 8. In the preferred embodiment, the flared bores of such bushings are oriented so that they respectively widen longitudinally and oppositely longitudinally. The conical flares or conical concavities of the bushings 26 and 28 are preferably closely fitted for nesting receipts of the conical flares 52 and 36 which are respectively formed at the longitudinal and oppositely longitudinal ends of the collet sleeve 34. Such conically bored bushings 26 and 28 advantageously work in combination with the conically flared ends 52 and 36 of the collet sleeve for securely rotatably holding such sleeve within the hollow bore 28, and for substantially automatically centering such sleeve in alignment with such bore's longitudinal axis. The threadedly mounted longitudinal collet sleeve flare 52 may be adjustably tightened or loosened to assure that the flares 36 and 52, while nested within their conical bored bushings 28 and 26, may function as rotary bearings simultaneously with performance of their axial centering functions. Upon counter-clockwise turning of the collet sleeve's longitudinal segment 54 resulting in threaded removal of the conical flare 52 from the longitudinal end of the collet sleeve 34, longitudinal installations and oppositely longitudinal extractions of such sleeve 34 into and out of the oppositely longitudinal end of the hollow bore 8 are advantageously facilitated.

In operation of the collet chuck and collet sleeve combination, a vertical rotation stopping pin 42 which extends within pin channel 16 may be initially slidably moved downwardly so that such pin's lower end 40 protrudes downwardly into socket 38. To control such sliding motion of pin 42, a friction pin 46 may be helically threadedly mounted by male threads 22 in engagement with female threads 48 which are formed at the oppositely longitudinal end of the pin channel 49. Threaded tightening of such pin 46 advantageously extends its longitudinal end into a vertical travel slot 44 formed within the side wall of the vertical pin 42, such extension producing frictional contact between the longitudinal end of pin 46 and the pin 42 within travel slot 44. Such contact allows the pin 42 to be selectively slidably moved and positioned upwardly and downwardly within channel 16 while the pin 46 holds pin 42 of a desired position.

While the lower end 40 of the pin 42 engages the collet sleeve 34 via protrusion into socket 38 as indicated in FIG. 3, clockwise rotation of turn knob 74 may rotate the longitudinal segment 66 of the collet chuck without impelling any co-rotation of the collet sleeve 34. The simultaneous engagement of pin 50 within slot 51 correspondingly assures that such clockwise turning of knob 74 does not impel rotary motion of the oppositely longitudinal segment 64 of the collet chuck. With rotation of the oppositely longitudinal segment 64 of the collet chuck mechanically stopped by pins 42 and 50, the clockwise rotation of the turn knob 74 causes helical threads 70 to pull longitudinally against the helical threads of shaft 68. Such pulling action effectively drives the collet chuck's conically flared jaws 90 or 306 into the mating conically flared concavity of the collet sleeve's conically flared oppositely longitudinal end 36. Accordingly, such rotary turning of knob 74 actuates annular clamping or radially inward clamping motions of the jaws 90 or 306 against an object (such as bullet 104 or 300 which serves as a mandrel) which is inserted into and received within the clamping space 92 or 312.

Upon such screw actuation of the jaws 90 or 306, frictional clamping forces are correspondingly exerted radially outwardly at the interface between the flared jaws 90 or 306 and the inner surface of the collet sleeve's flare 36. Accordingly, upon an upward retraction of pin 42 to cause its lower end 40 to clear slot 38, continued or turning of turn knob 74 effectively rotates the entire collet chuck and collet sleeve combination within the hollow bore 8.

Upon re-engagement of pin 42 within socket 38, and upon counter-clockwise turning of the turn knob 74, the longitudinal segment 66 of the collet chuck may threadedly move within hollow bore 39 causing conical bearing surfaces 71 and 75 to longitudinally separate. Upon such screw thread actuated longitudinal retraction of collet chuck's segment 66 away from segment 64, the above described engagement of the jaws 90 within the collet sleeve's oppositely longitudinal flare 36 may on occasion continue, undesirably fixing the collet chuck within the collet sleeve. As shown in FIG. 3, the flare angle of jaws 90 is preferably less than that of flare 75 so that an extending operation of jack screw 68,70 will consistently disengage the collet chuck 64,66 from the collet sleeve 34 at least at such sleeve's longitudinal end.

The pivoting lever arm 81 is preferably configured to facilitate an oppositely longitudinal disengagement of jaws 90 or 306 from collet sleeve flare 36 where the above described extending operation of the jack screw 68,70 separates only the longitudinal end of the collet chuck 64,66 from the collet sleeve 34. Such lever arm 81 is mounted within slot 4 upon a pivot pin 76 which extends laterally through the apertures 77 within the housing 2 to traverse the slot 4, such pin 76 extending centrally through a pin receiving eye 75 which serves a pivot point or fulcrum. To enable its assistance in dislodging the jaws 90 or 306 from the flare 36 of the collet sleeve 34, the pivoting lever arm 81 may present an upwardly extending arm 80 whose upper or distal end forms an upwardly and forwardly curved wedging surface 82. To operate such arm 80 and wedge surface 82, an operator may grasp the extreme longitudinal end 84 of the lever arm 81 and may pull upwardly thereon. Such upward pulling action advantageously causes the curved wedging surface 82 of arm 80 to bear against or impinge against the peripheral edge of flange 72. Provided that flange 72 and conical bearing 75 have previously been threadedly spaced a slight distance longitudinally away from the extreme longitudinal end of the collet sleeve 34, such impinging contact of the curved surface 82 against the flange 72 may operatively drive the collet chuck 64,66 oppositely longitudinally within the collet sleeve's hollow bore 39. Such wedge driving action upon the collet chuck advantageously disengages the jaws 90 or 306 from the flared oppositely longitudinal end of the end 36 of the collet sleeve 34. Thereafter, upon their threaded disengagement, the longitudinal and oppositely longitudinal segments 66 and 64 of the collet chuck may be respectively extracted longitudinally and oppositely longitudinally from the collet sleeve's hollow bore 39.

In use of the instant inventive apparatus, and assuming that the provided means for bullet axial alignment includes the ogive land 88 of FIG. 6, a rifle cartridge 100 loaded with propellant 102 may be longitudinally inserted into the collet chuck's mandrel clamping space 92, such insertion preferably continuing until the curved ogive portion 108 of the nose of such cartridge's bullet 104 bears against and stops upon the collet chuck's annular ogive centering land 88. Such land 88 is preferably angled between 20° and 25° with respect to the central longitudinal axis of throat 86. Such angular orientation of the land 88 allows the contact of the ogive 108 with the land 88 to be tangential for the prevention of marring or gouging of the bullet 104. In addition to its performance of an insertion stopping function, the ogive centering land component 88 is preferably precisely configured so that it may automatically axially center the nose of the bullet 104, such centering holding the tip or point of the bullet 104 in alignment with the axis of the throat 86.

Rifle bullets such as bullet 104 typically include a substantially cylindrical section 105 which is compressively received within a geometrically matching cylindrical neck portion 106 of the cartridge's casing. The ogive centering land 88 component of the instant invention is preferably correspondingly longitudinally positioned so that, upon such land's action as a stop against the insertion of the bullet, the clamping surfaces 91 of the collet chuck's jaws 90 substantially completely cover the casing's neck 106. In such overlapping orientation, the oppositely longitudinally ends of the jaws' clamping faces 91 preferably substantially coincide with the annular angled transition 107 which resides at the oppositely longitudinal end of the casing's neck 106 and at the longitudinal end of the casing's shoulder 103. Upon such overlapping orientation, the corner transitions between jaws' clamping surfaces 91 and their oppositely longitudinal faces advantageously function as casing neck bending fulcrums.

Upon collet clamping of the rifle cartridge 100 as described above, bending forces applied to the body of the cartridge may malleably bend the casing at and about the neck/shoulder transition 107 without substantially affecting or altering the clamped axial alignments of the bullet 104. Simultaneous incorporation of the flexible jaw ties 310 of the FIG. 6A alternative further protects the axial alignment of the longitudinal end of the casing's neck 106 or 304 while preserving the neck/bullet pressure seal.

Upon application of such axial bending force to the body of the cartridge 100, the tangential engagement of the ogive centering land 88 with the bullet's ogive 108 beneficially utilizes the longitudinal extension of the bullet from the neck 106 as a counter-torque exerting lever arm, such arm resisting and countering any twisting forces which may be applied to the bullet 104. In the FIG. 6A alternative, the longitudinal ends of jaws 306 may provide such counter-torque.

It may be noted that, upon enlargements of the bushing 30, the sleeve flare 36, the jaws 90 or 306, and the clamping space 92 or 312 (or upon providing a smaller bullet cartridge), the orientation of the rifle cartridge 100 could be reversed. Upon such cartridge reversal, the rim end of the cartridge could be alternatively extended into and clamped within space 92 or 312. Such reverse orientation clamping of a cartridge would oppositely longitudinally cantilever the casing neck 106 and the nose 108 of the bullet 104 from the oppositely longitudinal ends of such collet chuck jaws. However, such a reversal of the orientation of the cartridge would reverse the orientation of the cartridge's conical shoulder section 103. In such reversed orientation, the oppositely longitudinal ends of the jaw's clamping faces could not reside at or clamp against the cartridge's shoulder/neck transition 107. In absence of annular clamping at such transition 107, axis straightening torsional forces applied against the nose 108 of such cantilevering bullet would be undesirably opposed or countered exclusively within casing's unclamped and unsupported neck 106. Localized torsion or counter-torquing forces exerted within the casing's neck 106 against the bullet 104 would threaten to distort the neck, resulting in an undesirable degradation of the neck's compression seal around the bullet 104. The instant invention, by mechanically enabling casing neck clamping and bullet nose centering within the throat of its collet chuck, may be viewed as facilitating application of axial straightening torsion forces against the body of the cartridge while preventing such compression seal degradation.

In order to allow the instant inventive apparatus to precisely adjust and bend the casing of the rifle cartridge 100, a concentricity gauge 120 may be provided, such gauge having an upwardly and downwardly extendable shaft 126, and a lower foot 128. A lateral slide bar 122 may be mounted for gauge support within lateral bracket 10, such slide bar 122 facilitating overlying positioning of the concentricity gauge 120 in relation to the rifle cartridge 100. A concentricity gauge mounting bracket 124 which spans between the concentricity gauge 120 and the slide bar 122 is preferably further provided as a support component.

In operation of the concentricity gauge 120, the foot 128 of the gauge preferably bears against the body of the rifle cartridge 100, as shown in FIG. 1. Rotation induced deflections of the oppositely longitudinal end of the cartridge 100 are reflected upon the dial of the concentricity gauge 120 as the foot 128 rides circularly around the case. Accordingly, a rotary position of the cartridge 100 at which its body is maximally downwardly deflected may be detected via readings upon the dial of the concentricity gauge.

In order to correct a detected case body deflection, an oppositely longitudinally extending levered arm 78 is provided, such arm being fixedly attached to or formed wholly with the oppositely longitudinal end of the lever arm 81. A plastic shoe 79 is mounted over the levered arm 78 so that, upon downward pressing by an operator upon the longitudinal end 84 of the lever arm 81, the shoe 79 may forcefully press upwardly against the rifle cartridge 100. Such shoe pressure may slightly upwardly bend the rifle cartridge at its neck transition fulcrum point 107. Repetition of the process described above easily configures the rifle cartridge 100 so that the concentricity gauge 120 shows no axial deflection or distortion of the body of the cartridge 100 with respect to its neck 106. Accordingly, the instant inventive apparatus is advantageously capable of precisely axially aligning the neck 106 of the cartridge 100 along with bullet 104 with the central longitudinal axis of the cartridge's casing.

Figure 8:
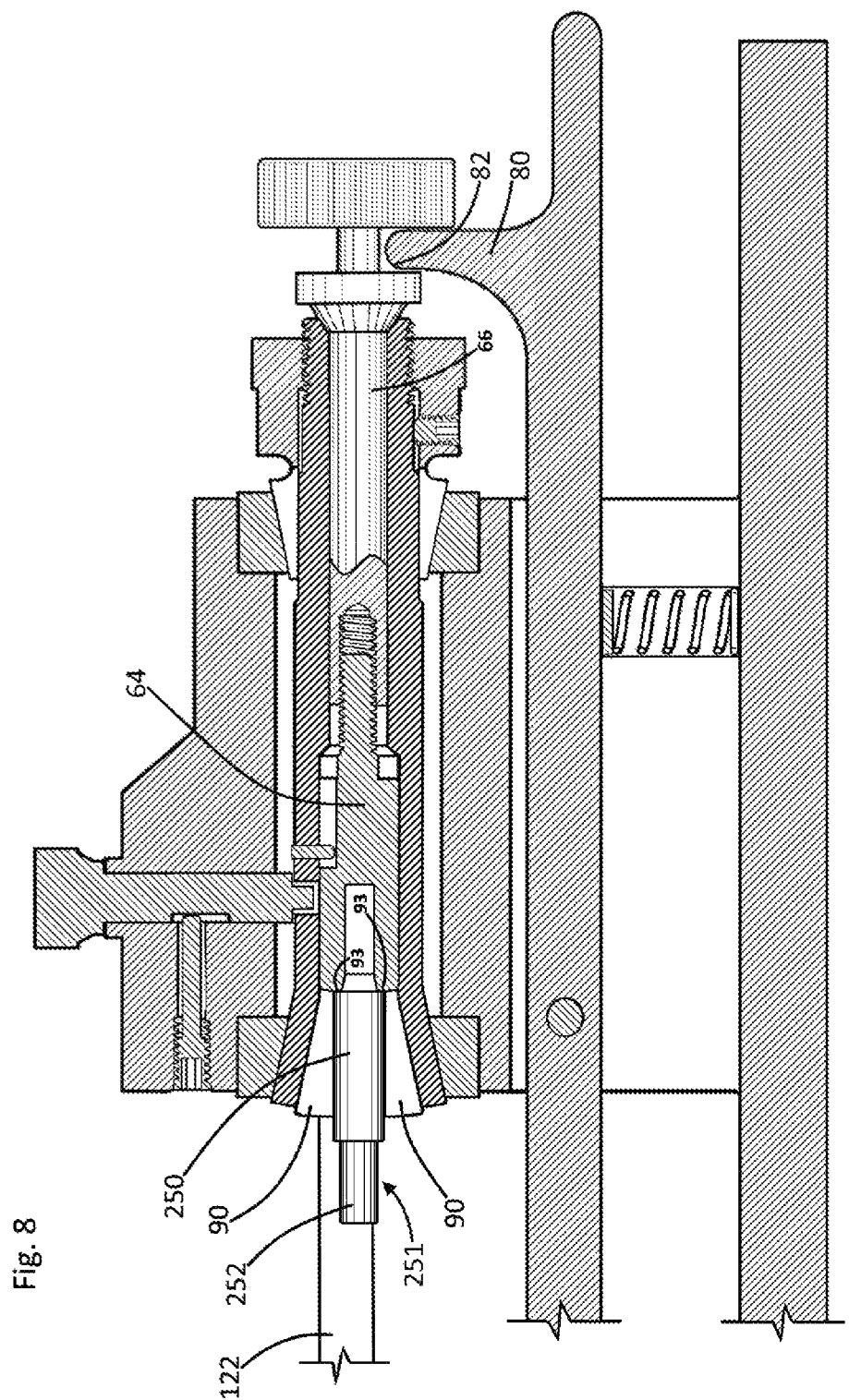
FIG. 8 is a sectional view as indicated in FIG. 7.

Referring further to the alternative configuration of FIG. 8, the loaded rifle cartridge 100 may be removed, and a mandrel adapter 251 may be inserted into the collet chuck's mandrel receiving space 92. Upon such insertion, the cylindrical body 250 of the adapter 251 stops against an annular step 93 which resides at the longitudinal ends of the collet chuck jaws 90. Referring to FIG. 6A, a similarly functioning adapter insertion stopping step forms a transition between throat sections 312 and 314. Following such insertion of the adapter 251, the apparatus 1 may be utilized to clamp the adapter 251 in a manner similar to the above described clamping action applied to the neck 106 of the rifle cartridge 100.

Upon such adapter clamping, an alternative bullet case neck working mandrel 252 is advantageously provided. As a further alternative to FIG. 8's depicted provision of the mandrel adapter 251, the complete oppositely longitudinal segment 64 of the collet chuck may be removed, and such segment may be replaced with a segment which includes a wholly or integrally formed casing neck working mandrel (not depicted within views) which may serve as a functional equivalent of the adapter deployed mandrel 252.

Figure 7:
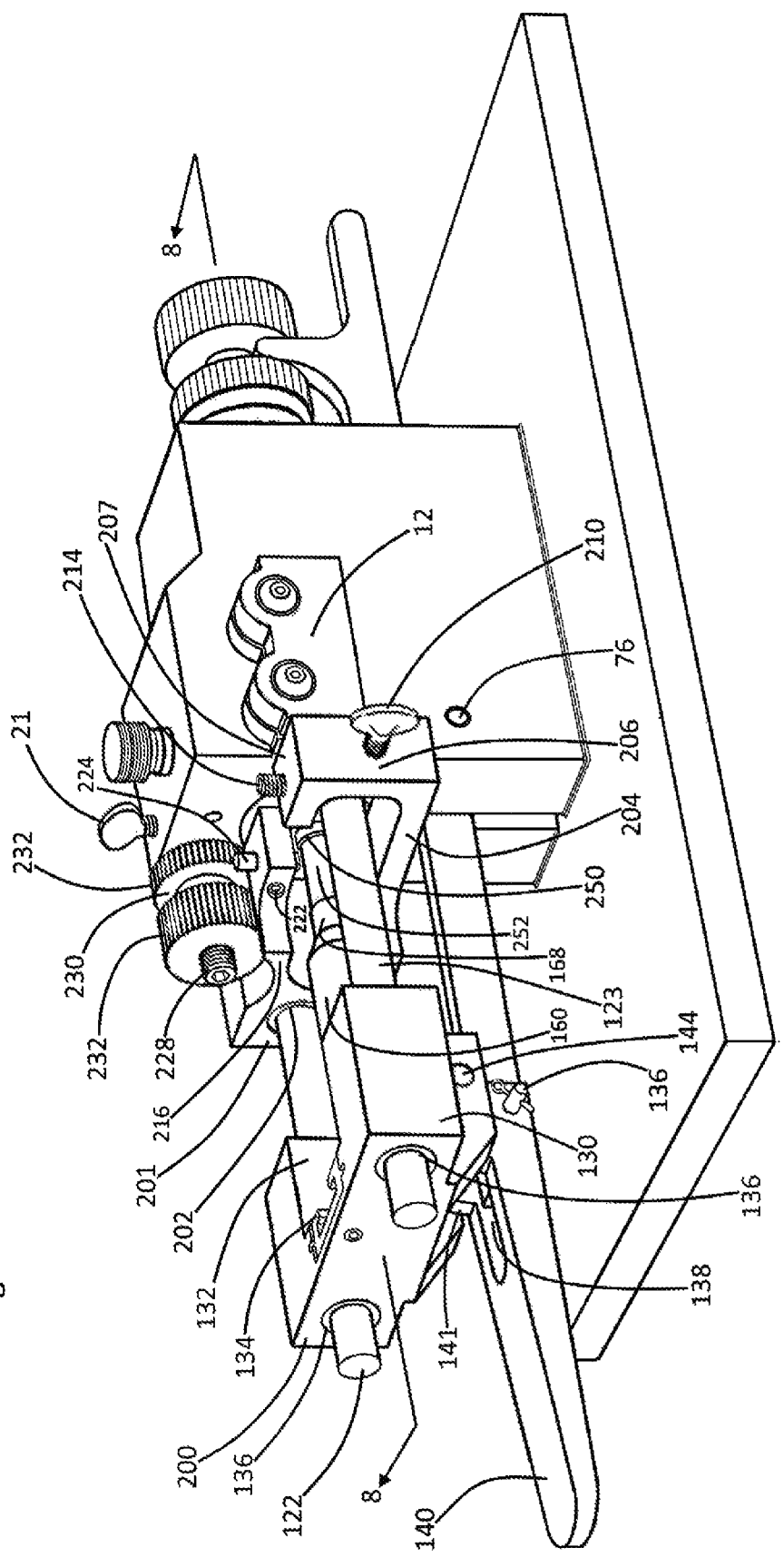
FIG. 7 redepicts the structure of FIG. 1, the view of FIG. 7 showing an alternative configuration including bullet casing lathing components.

The alternatively installed mandrel adapter 251 may be advantageously utilized for, referring further to FIG. 7, radially inwardly supporting a neck portion 168 of an unloaded cartridge casing 160. In order to longitudinally drive such cartridge casing 160 onto such alternative mandrel 252, a second or oppositely lateral slide bar 123 is preferably mounted within bracket 12, and a sliding driver block 200 is provided. Such driver block 200 has longitudinally extending sleeves 136 which slidably receive the slide bars 122 and 123. In assembling the driver block 200 for use, the lip of the longitudinal mouth of the casing's neck 168 may be initially placed into contact with the extreme oppositely longitudinal end of the mandrel 252. Simultaneously, the body of the case 160 may be downwardly inserted into case receiving space 132. Upon such insertion, the ejector rim at the oppositely longitudinal end of the case 160 may be downwardly extended into an ejector rim engaging adapter 134, such adapter being interchangably installed within the oppositely longitudinal wall of the driver block 200. Such ejector rim adapter 134 operates to push or pull upon the ejector rim of cartridge case 160 of the oppositely longitudinal end of the driver block's case receiving space 132. In order to allow the driver block 200 to drive against or alternatively pull upon various sizes and configurations of case ejector rims, various sizes ejector rim adapters 134 may be provided, such adaptors having "U" slot configured interior surfaces which are closely fitted to the outer geometries of the various case ejector rims.

Upon such mounting of the cartridge case 160 upon mandrel 252 and within ejector rim adapter 134, longitudinal driving pressure applied to the driver block 200 may advantageously compressively and slidably move the case 160 longitudinally from its FIG. 7 position to the alternative position depicted in FIG. 9 wherein the casing neck 168 is securely mounted over mandrel 252.

A linear motion actuator is preferably provided for driving the block 200 and the adapter 134 against the case 160, and in the preferred embodiment, such actuator comprises a lever arm 140 and levered arm 141 combination. A clevis opening 138 is preferably formed at the fulcrum transition between the levered arm 140 and the lever arm 141, such clevis opening receiving the extreme oppositely longitudinal end of arm 78. Upon such clevis mounting, arm 78 performs a dual or further function as a structural tie bar or as a pivoting link spanning between pivot pins 76 and 136. The ability of arm 78 to pivot about pin 76 allows the actuated levered arm 141 to apply an exclusively longitudinally directed driving force to block 200 along the slide bars. It may be noted that the pivoting arm 78 advantageously dually and alternatively functions as a biasing and bending member when utilized in the FIG. 1 configuration and as a pivoting linear motion actuating tie when utilized in the FIG. 7 configuration. A pivot pin 136 preferably pivotally interconnects the arms 140 and 141 with the pivoting tie bar 78, and a second pivot pin 144 joins the distal end of levered arm 141 with the driver block 200.

Upon upward levering of lever arm 140 from its FIG. 7 position to its FIG. 9 position, the driver block 200 and adapter 134 are advantageously slidably moved longitudinally along slide bars 122 and 123 against the casing 160, such motion beneficially driving the casing's neck 168 over mandrel 252. Opposite and downward levering of the lever arm 140 causes the block 200 to withdraw oppositely longitudinally, such levering causing the ejector rim engaging adapter 134 to oppositely longitudinally withdraw the casing's neck 168 from the mandrel 252.

In order to perform rotary lathing upon the casing neck 168 following compressive mounting of the neck upon the alternatively provided mandrel 252, a case neck lathing "U" member 201 is preferably provided, such "U" member having a web portion 203, an upper arm portion 216, and a lower arm portion 215. The web portion 203 of such "U" member 201 preferably includes a longitudinally extending slide sleeve 202 through which the lateral slide bar 122 longitudinally extends.

A lathing iron 224 having a radially inner cutting end 226 is securely mounted upon the upper "U" member arm 216 within a cylindrical socket, such iron being secured thereto by a helically threaded set screw 222. Downward driving actuation of the lathing iron 224 against the cartridge case's neck 168 is preferably provided by an angular wedge 212 which may slidably bear against the undersurface of the oppositely lateral slide bar 123. Such wedge 212 may be compressively driven laterally against slide bar 123 by a thumb turnable screw 210 which is threadedly mounted within a mounting flange 206 which is formed wholly with the distal end of "U" arm 215. Progressive clockwise turning of screw 210 rotates the entirety of the "U" member 201 in the clockwise direction about slide bar 122, such rotary motion driving the cutting end 226 of lathing iron 224 against casing's neck 168 for rotary lathing of such neck.

Upon oppositely laterally withdrawing the screw 210 and its wedge member 212, a spring biasing pin 214 automatically rotates the "U" member 201 in the counter-clockwise direction, advantageously automatically raising the lathing iron's cutting end 226 above the surface of the casing neck 168.

In order to progressively move the entire "U" member lathing assembly 201 longitudinally along the casing neck 168, a helically threaded shaft 228 is fixedly mounted, referring further to FIG. 1, within socket 18. A set screw 21 is utilized for securely fixing such helically threaded shaft 228 within such socket 18. An internally helically threaded thumb turn wheel 232 is threadedly mounted over the threaded shaft 228, such wheel 232 having a radially outwardly opening annulus or channel 230. The wheel 232 rotates within an upwardly opening concavity 229 formed within the "U" member 201, and a carry pin 233 mounted within and extending upwardly into such concavity engages such channel 230. Accordingly, upon turning and counter-turning of the wheel 232, such wheel moves threadedly and longitudinally or oppositely longitudinally along the helically threaded shaft 228. Such screw actuated longitudinal motions of wheel 232 carries the "U" member 201 via its engagement with the pin 233. As an alternative to provision of such carry pin 233, the concavity 229 may be configured to include a laterally extending ridge or wall (not depicted within views), such wall extending upwardly into channel 230. Accordingly, counter-clockwise turning of wheel 232 advantageously progressively moves the lathing iron 224 and its cutting end 226 oppositely longitudinally along the longitudinal length of casing neck 168. Simultaneous or successive turning actions applied to turn knob 74 and to turn wheel 232 may progressively lathe the longitudinal length of the casing's neck 168. Upon completion of such lathing, the casing's neck 168 advantageously assumes a proper circular cylindrical geometric configuration.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An apparatus for correcting a distortion in a bullet cartridge casing's neck, said casing further having a body and a rim, said apparatus comprising:
    (a) a frame;
    (b) a collet chuck and collet sleeve combination, said combination's collet chuck having a longitudinal end and an oppositely longitudinal end, said combination's collet chuck further having a circumferential array of jaws having longitudinal ends, said combination's collet chuck further having a throat bounded by the circumferential array of jaws;
    (c) means for, upon a receipt of a bullet within the bullet cartridge casing's neck, aligning said bullet, said means being positioned within the throat;
    (d) mounting means attaching the collet chuck and collet sleeve combination to the frame, said means being adapted for facilitating rotation of said combination; and
    (e) turning means connected operatively to the collet chuck and collet sleeve combination.

2. The apparatus of claim 1 wherein the means for aligning said bullet comprises a plurality of flexible jaw ties or a bullet ogive centering land.

3. The apparatus of claim 2 wherein the oppositely longitudinal end of the collet chuck is externally conically flared.

4. The apparatus of claim 3 wherein an oppositely longitudinal end of the collet sleeve is internally conically flared, said end being fitted for nesting receipt of the collet chuck's oppositely longitudinal end.

5. The apparatus of claim 4 wherein the means for aligning said bullet comprises the plurality of flexible jaw ties, wherein each tie among the plurality of flexible jaw ties extends longitudinally from a longitudinal end of one of the jaws.

6. The apparatus of claim 4 wherein the means for aligning said bullet comprises the bullet ogive centering land, wherein said land extends annularly.

7. The apparatus of claim 6 wherein the bullet ogive centering land is internally conically flared.

8. The apparatus of claim 7 wherein the bullet ogive centering land and the throat have a common longitudinal axis, and wherein the internal conical flare of the bullet ogive centering land is angled between 20° and 25° with respect to said axis.

9. The apparatus of claim 4 wherein the collet chuck comprises a longitudinal segment and an oppositely longitudinal segment, and further comprising a jack screw assembly interconnecting said segments.

10. The apparatus of claim 9 further comprising a first rotation stop connected operatively to the frame, the first rotation stop being adapted for alternatively resisting and permitting rotation of the collet sleeve with respect to the frame.

11. The apparatus of claim 10 wherein the first rotation stop comprises a slide pin.

12. The apparatus of claim 11 further comprising a second rotation stop connected operatively to the collet sleeve, the second rotation stop being adapted for resisting rotation of the collet chuck's oppositely longitudinal segment with respect to the collet sleeve.

13. The apparatus of claim 12 wherein the second rotation stop comprises a pin and slide slot combination.

14. The apparatus of claim 4 wherein the mounting means comprise longitudinal and oppositely longitudinal bushings, said bushings being internally conically flared.

15. The apparatus of claim 14 wherein the collet sleeve has externally conically flared longitudinal and oppositely longitudinal ends, said ends being respectively fitted for nesting receipts within the longitudinal and oppositely longitudinal bushings.

16. The apparatus of claim 15 wherein the collet sleeve comprises longitudinal and oppositely longitudinal segments, and further comprising helical threads interconnecting said segments.

17. The apparatus of claim 4 comprising a lever arm having an oppositely longitudinal end pivotally mounted upon the frame, comprising a levered arm fixedly attached to and extending oppositely longitudinally from the lever arm's oppositely longitudinal end, and comprising a shoe fixedly attached to an oppositely longitudinal end of the levered arm.

18. The apparatus of claim 17 further comprising a wedge driver fixedly attached to or formed wholly with a longitudinal end of the lever arm, the wedge driver being adapted for, upon pivoting of said lever arm's longitudinal end toward a longitudinal end of collet chuck, biasing against said collet chuck's longitudinal end for oppositely longitudinally driving the collet chuck.

19. The apparatus of claim 4 comprising a concentricity gauge having a foot, and a support spanning from the frame to the concentricity gauge, the support being adapted for, upon a receipt of the bullet cartridge casing's neck between the collet chuck's jaws, holding the concentricity gauge's foot against the bullet cartridge casing's body.

20. The apparatus of claim 19 wherein the support comprises at least a first slide bar fixedly attached to or formed wholly with the frame, said bar extending oppositely longitudinally from the frame.

21. The apparatus of claim 20 wherein the support further comprises a bracket spanning between the concentricity gauge and the at least first slide bar.

22. The apparatus of claim 4 further comprising an adapter having longitudinal and oppositely longitudinal ends, the adapter's longitudinal end being fitted for receipt between the collet chuck's jaws, and the adapter's oppositely longitudinal end being adapted for nesting receipt within the bullet cartridge casing's neck.

23. The apparatus of claim 22 further comprising a lathe iron and a guide assembly, said assembly supporting the lathe iron upon the frame, said assembly being adapted for, upon the nesting receipt of the adapter's oppositely longitudinal end within the bullet cartridge casing's neck, and upon co-rotation of the collet chuck and collet sleeve combination, the adapter, and the bullet casing's neck, holding a radially inner end of the lathe iron against a radially outer surface of said neck.

24. The apparatus of claim 23 wherein the guide assembly comprises a lateral slide bar fixedly attached to and extending oppositely longitudinally from the frame, and further comprises a "U" member whose web has a slide bar receiving eye, wherein said eye slidably receives said slide bar, and wherein the lathe iron is fixedly attached to one of the "U" member's arms.

25. The apparatus of claim 24 further comprising a screw assembly spanning operatively between the frame and the "U" member, said assembly being adapted for moving the lathe iron oppositely longitudinally along the bullet cartridge casing's neck.

26. The apparatus of claim 25 comprising an oppositely lateral slide bar fixedly attached to and extending oppositely longitudinally from the frame, and further comprising a wedge actuator connected operatively to the "U" bracket's other arm, said wedge actuator being adapted for engaging a lower surface of the oppositely lateral slide bar for biasing the one of the "U" member's arms and the lathe iron against the radially outer surface of the bullet cartridge casing neck.

27. The apparatus of claim 22 comprising lateral and oppositely lateral slide bars fixedly attached to and extending oppositely longitudinally from the frame, comprising a driver block slidably mounted upon said slide bars, and comprising a linear motion actuator operatively spanning between the driver block and the frame, said actuator being adapted for, upon positioning the bullet cartridge casing's neck at the adapter's oppositely longitudinal end, longitudinally driving said block against said casing for driving said neck over the adapter's oppositely longitudinal end.

28. The apparatus of claim 27 wherein the linear motion actuator comprises a lever arm and levered arm combination.

29. The apparatus of claim 28 wherein the driver block comprises a rim engaging slot, said slot being adapted for oppositely longitudinally pulling the bullet cartridge case upon an opposite actuation of the lever arm and levered arm combination.

* * * * *